United States Patent
Kelly

(10) Patent No.: US 7,498,982 B1
(45) Date of Patent: Mar. 3, 2009

(54) METHOD TO IMPROVE ACCURACY OF TARGETED POSITION ESTIMATION THROUGH USE OF MULTIPLE NETWORKED OBSERVATIONS

(75) Inventor: John T. Kelly, Murrieta, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 33 days.

(21) Appl. No.: 11/501,574

(22) Filed: Aug. 9, 2006

(51) Int. Cl.
  G01S 5/14 (2006.01)
  G01S 3/02 (2006.01)
(52) U.S. Cl. .............................. 342/357.14; 342/463
(58) Field of Classification Search ............ 342/357.13, 342/357.14, 357.08
  See application file for complete search history.

(56) References Cited

U.S. PATENT DOCUMENTS

| | | | |
|---|---|---|---|
| 4,949,089 A * | 8/1990 | Ruszkowski, Jr. | 342/52 |
| 5,471,218 A * | 11/1995 | Talbot et al. | 342/357.03 |
| 5,506,588 A * | 4/1996 | Diefes et al. | 342/357.11 |
| 5,672,820 A * | 9/1997 | Rossi et al. | 73/178 R |
| 5,812,961 A * | 9/1998 | Enge et al. | 701/207 |
| 6,064,942 A * | 5/2000 | Johnson et al. | 701/213 |
| 6,169,497 B1 * | 1/2001 | Robert | 340/988 |
| 6,388,611 B1 * | 5/2002 | Dillman | 342/357.06 |
| 6,480,148 B1 * | 11/2002 | Wilson et al. | 342/357.08 |
| 6,727,849 B1 * | 4/2004 | Kirk et al. | 342/357.14 |
| 6,839,017 B1 * | 1/2005 | Dillman | 342/16 |
| 6,861,982 B2 * | 3/2005 | Forstrom et al. | 342/387 |
| 6,895,356 B2 * | 5/2005 | Brimhall et al. | 702/150 |
| 7,061,426 B1 * | 6/2006 | Fey et al. | 342/357.08 |
| 7,102,570 B2 * | 9/2006 | Bar-On et al. | 342/465 |
| 7,162,367 B2 * | 1/2007 | Lin et al. | 701/220 |
| 7,248,211 B2 * | 7/2007 | Hatch et al. | 342/357.03 |
| 2002/0003495 A1 * | 1/2002 | Johnstone et al. | 342/357.13 |
| 2002/0027524 A1 * | 3/2002 | Pippin | 342/357.08 |
| 2005/0108261 A1 * | 5/2005 | Glassy et al. | 707/100 |
| 2005/0216193 A1 * | 9/2005 | Dorfman et al. | 701/213 |
| 2006/0055600 A1 * | 3/2006 | Reuveni et al. | 342/455 |

OTHER PUBLICATIONS

Johnson & Russo: Enhanced Precision Targeting Using a PLGR GPS Receiver Integrated with a Laser Range Finder, Institute of Navigation (ION), 1996.

* cited by examiner

*Primary Examiner*—Thomas H Tarcza
*Assistant Examiner*—Harry Liu

(57) ABSTRACT

A system and method of generating targeted position estimation of a remote target through a set of networked observers. The system has a global positioning system ("GPS") receiver for deriving a first observer's current location, a range finder for deriving elevation, range and azimuth information with respect to the target, an estimation engine for generating target data based on the derived information, a data receiver or a radio for receiving other target data from other observers and forwarding the other target data to the estimation engine. Finally the estimation engine correlates and combines all received target data to derive a final target solution.

2 Claims, 4 Drawing Sheets

METHOD TO IMPROVE ACCURACY OF TARGETED POSITION ESTIMATION THROUGH USE OF MULTIPLE NETWORKED OBSERVATIONS

FIELD OF THE INVENTION

The present invention relates to targeted position estimation of a remote location or object, and more particularly relates to targeted position estimation by an observer using a GPS receiver and laser rangefinder.

ART BACKGROUND

Position estimation of a remote target location, i.e. deriving the position/location of a remote object or location of interest, has always been important in both military and civilian environments. In the civilian world, position estimation of a target location, which may be a location or object far away from a surveyor's position, is used in construction, bridge or dam building, land management etc. With the help of a GPS ("Global Positioning System") receiver and a range finder, the position estimate of a remote location can usually be derived from the surveyor's own location. To reduce the errors inherent in the equipment and in the operator, multiple measurements or "shots" may be made by the surveyor from various widespread locations. Even with multiple surveyors taking multiple shots from different locations, the final position estimate is still unsatisfactory due to the inherent equipment error in each surveyor's equipment. Worse, when multiple surveyors make the observation, the lack of time synchronization adds error and complication in combining measurements for the final estimation.

In the military world, precise and reliable forward observation of targets is one of the most significant capabilities desired by today's military applications. Conventionally, derivation of a remote target position is performed by extrapolating an estimate of range and azimuth from an estimate of an initial position. Target range and azimuth can easily be derived by the use of a common laser range finder ("LRF"), while the initial position can be derived by maps, databases, or GPS receivers. For example, Rockwell Collins, Inc., Assignee of the present application, has provided integrated handheld units of LRF and GPS equipment, which allow data exchange from the LRF to the GPS for computation purposes. The technology underlying the integration of LRF and GPS units has been presented by Mark W. Johnson and Nicholas F. Russo in a publication, entitled "ENHANCED PRECISION TARGETING USING A PLGR GPS RECEIVER INTEGRATED WITH A LASER RANGE FINDER," published by Institute of Navigation, 1996. The entire disclosure of the publication (hereinafter "Johnson Paper") is incorporated by reference as if fully set forth herein.

By applying the LRF-generated range and azimuth to the GPS-derived position, the resulting position has approximately the same accuracy as the autonomously-derived GPS position's circular error probable ("CEP") with some additional error, primarily in azimuth (due to the inherent inaccuracies of the digital magnetic compass) and secondarily in distance (from the LRF's range estimation). The result is a fairly wide error ellipse of the target position and a large estimate of error (which, while elliptical, is still common to utilize a circular estimate of probable error or "CEP" metric to describe). Such errors, commonly known as measurement errors, are compounded by two common source errors, known as systematic errors and operator errors. Additional measurements (also known as "shots") or estimates by an observer from the same location would do little to reduce the target position error, since the same error sources and issues are still involved. If, however, the observer obtains additional change of azimuth between each new observation, a reduced overall target position error may be achieved by virtue of the overlap of each new position's error ellipse. To reduce the effect of measurement and common source targeting errors, the Johnson Paper teaches a method of combining sufficiently different azimuth measurements from a single user's two or more observations to reduce the overall targeting estimation error.

Despite the obvious advantages, there is still a practical difficulty in the "single user, multiple observations" approach. That is, the single observer must be able to move from position to position in order to obtain the necessary multiple observations. Such a requirement turns out to be impractical and unsafe, since the forward observer is usually in a concealed location. Any unnecessary movement may both place a military user at higher risk of detection and (for commercial or military users) be simply impossible due to environmental surroundings or other constraints.

Another approach has been to place multiple (two or more) observers capable of sighting a common target and combine the multiple observations. By applying each measurement as an uncorrelated vector, i.e. range and azimuth, from independent positions, any attempt to resolve a single point location often becomes an "eyeballing" task by the overseeing officer to determine a compromised estimate without regard to reducing any important contributing factors, such as correlated common and systemic errors and time of measurements.

SUMMARY OF THE INVENTION

A method and system for improving the accuracy of targeted position estimation through the deployment of multiple networked observations is disclosed. The method and system in accordance with the present invention enable communications between multiple (two or more) observers capable of sighting a common target and sharing the resulting target data of the target. Each observer through the use of a GPS receiver (for self position determination) and LRF (for range and azimuth estimation of target) creates a set of target data, which is then communicated to a designated observer, or optionally to the rest of the observers. Data correlation based on time of measurement taken and known characteristics of the GPS and LRF sensors is then applied to generate the resulting composite target data with a markedly reduced CEP. A radio/RF communication device may be used to facilitate the exchanging of target data among the observers.

In one preferred embodiment of the present invention, a system and method of generating targeted position estimation of a target through a set of networked observers is disclosed. The system uses a global positioning system ("GPS") receiver to obtain a first observer's current location, a laser range finder to derive elevation, range and azimuth information with respect to the target. The system then uses an estimation engine to generate target data based on the derived information. The system also uses a data receiver or a radio to receive target data from other observers and forward the received target data to the estimation engine. Finally the estimation engine correlates and combines all received target data to derive a final target solution.

BRIEF DESCRIPTION OF THE DRAWINGS

Additional objects, features and advantages of the present invention will become apparent from the following disclosure, wherein.

DETAILED DESCRIPTION OF THE PREFERRED EMBODIMENT

A method and system for improving the accuracy of targeted position estimation through the deployment of multiple networked observations is disclosed. In the description that follows, numerous specific details are set forth in detail to provide a more thorough understanding of the present invention. It will be apparent, however, to one ordinarily skilled in the art that the present invention may be practiced without these specific details. In other instances, well-known features have not been described in detail so as not to obscure the present invention.

Figure 1:
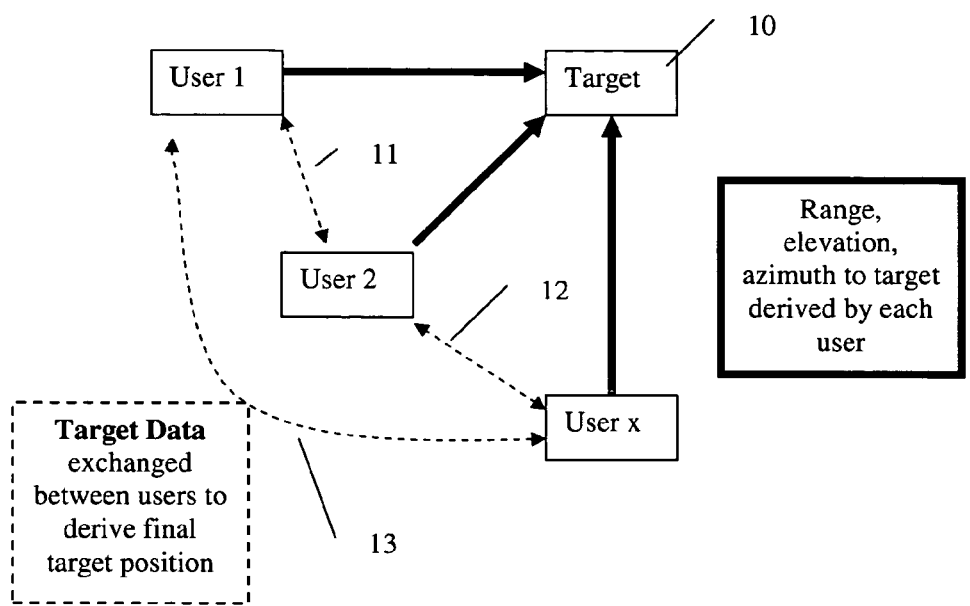
FIG. 1 illustrates a simplified general overview operations diagram in accordance with the present invention.

Reference is first to FIG. 1, where a simplified general operations overview diagram in accordance with the present invention is illustrated. Target 10 may be a remote target object, or a location, of interest to observers 1, 2, ... x. Each user, or observer, derives a target position estimate or a set of target data, which preferably includes at least range, elevation, azimuth to target, and error bounds of along and cross-track errors, by making a forward observation of target 10. Each user also derives its current location. As previously described, derivation of the target position estimate, current location, and variances by each observer is readily achievable by using an LRF and a GPS receiver, in stand-alone or integrated form. An exemplary integrated unit is a PLGR ("Precision Lightweight GPS Receiver") unit, Model No. AN/PSN-11, available from Assignee of the present application, Rockwell Collins, Inc., (www.rockwellcollins.com), and cabled with a LRF from Vectronix, Inc., (www.vectronix.com). Other LRF integration suppliers include companies such as Litton Industries and Northrop Grumman, among others.

Additionally, a bi-directional communication link 11, 12, 13, or broadcast, is preferably utilized by the LRF and GPS receiver such that the target data are exchanged among the observers 1, 2, ... x. As a result, each observer has not only its own target data, but also target data from all the other observers. Each observer can then independently derive a final target solution of target 10 by collocating all the target data received. By collocating all the target data's position coordinates and error estimates, the final target solution can be derived with reduced error bound. The process of collocating is readily achievable using minor modifications to the conventional targeting filter software for single receiver targeting as previously described, as can be appreciated by those skilled in the art.

The bi-directional communication link is also readily achievable by the use of a radio in combination with the GPS receiver, such as one ICOM Land Mobile Radio, Model F43GS or SELEX PRR ("Personal Role Radio") from SELEX of Canada. Both radios can be integrated with the DAGR GPS unit to create a Situational Data Advisor ("SDA") GPS+radio device available from Assignee of the present application. The teaching of the SDA GPS+radio is incorporated herein by reference. Alternately, the communication link may be uni-directional, where one observer or preferably multiple observers are designated as the collectors of the target data for computational purposes. All the other observers will transmit or broadcast their target data for the designated observers to compute the final target solution. As can be appreciated by those skilled in the art, it is preferable to have multiple, or all, observers compute the final target solution for reporting, since some observers may become unavailable, unreachable, or eliminated as in a hostile environment. Having the final target solution computed by multiple observes ensures safe delivery of the solution information back to the command.

Figure 2:
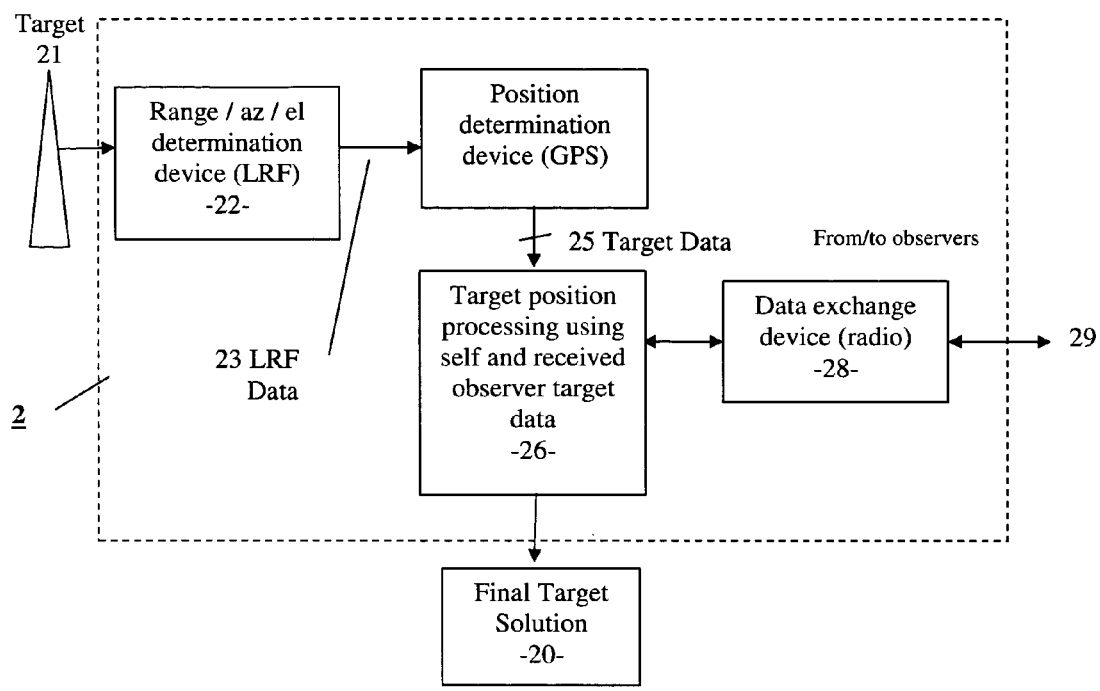
FIG. 2 illustrates a simplified system diagram of an exemplary device 2 in accordance with the present invention.

Reference is now turned to FIG. 2, where a simplified system diagram of an exemplary device 2 in accordance with the present invention is illustrated. The device 2 has a LRF 22, a GPS receiver 24 and a radio 28. Currently, two embodiments are realized: one configuration with a DAGR ("Defense Advanced GPS Receiver"), a cabled radio and a cabled LRF, or another configuration with a DAGR/radio and a cabled LRF. A DAGR, for example from Rockwell Collins, can preferably perform the functionality of the GPS 24 and position processing 26. It should be apparent to those skilled in the art that other configurations, or different levels of integration, are realizable based on the teaching of the present invention.

In operation, each observer or user makes an observation of the target 21, for example, a radio transmission tower. Upon acquisition, the target's range, azimuth and elevation relative to the observer (collectively "LRF data") are determined by the LRF 22. The LRF data 23 are forwarded to the GPS receiver 24, which also determines the observer's current position. It should be noted that the LRF data 23 is not required to derive the user's current position if the GPS receiver is enabled to do this task. The LRF data 23 is sent both to the LRF user's GPS for a local target estimation, and to the estimation engine 26 hosted either at the user's GPS or an external user's GPS (or PDA or PC). The error estimates are preferably generated at the GPS, since the LRF is usually not burdened with any processing task.

The "target data" 25, which preferably includes the observer's position, target range/elevation (optional)/azimuth measurements, time of measurement, variance values for position/range/azimuth/inclinometer devices used, magnetic variance setting, and geodetic reference data for position, are forwarded to the estimation engine 26 for target position processing using self and received observer target data, where the other observers' target data 29 are received through the radio or communication link 28. After processing by the estimation engine 26 of all the target data, a final position solution 20 can be generated. Elevation is optional since it may not be needed to the final derivation, although having elevation data would be more useful.

It should be noted that the functionality of the estimation engine 26 is preferably integrated or hosted within the GPS receiver 24, since the GPS receiver 24 already has the capability for programming waypoints etc. However, the physical implementation of the present invention is not limited to any particular hardware configuration. For example, on one hand, the estimation engine may be hosted by a portable unit that has an LRF, a GPS receiver and a radio all integrated in one. On the other hand, the estimation engine may be a software module implemented on a notebook computer or PDA, which is connected to an external LRF, GPS and radio units. As can be appreciated by those skilled in the art, the level of integration of the present invention is hardware-independent, and can be customized based on the specific application. Additionally, the communication link 28 may be a data-ready radio or a simple voice-only radio, which only requires the observers to read the target data over the link. It should be noted that there is no required format or protocol for the data exchange between radios, as long as the users can successfully exchange the required data in a satisfactory manner. In a simplest fashion, the users can just read off their data to each other. In a more automated fashion, data may be formatted and packaged for automatic transmission or broadcast, thus protecting the users from being detection or exposed.

Figure 3:
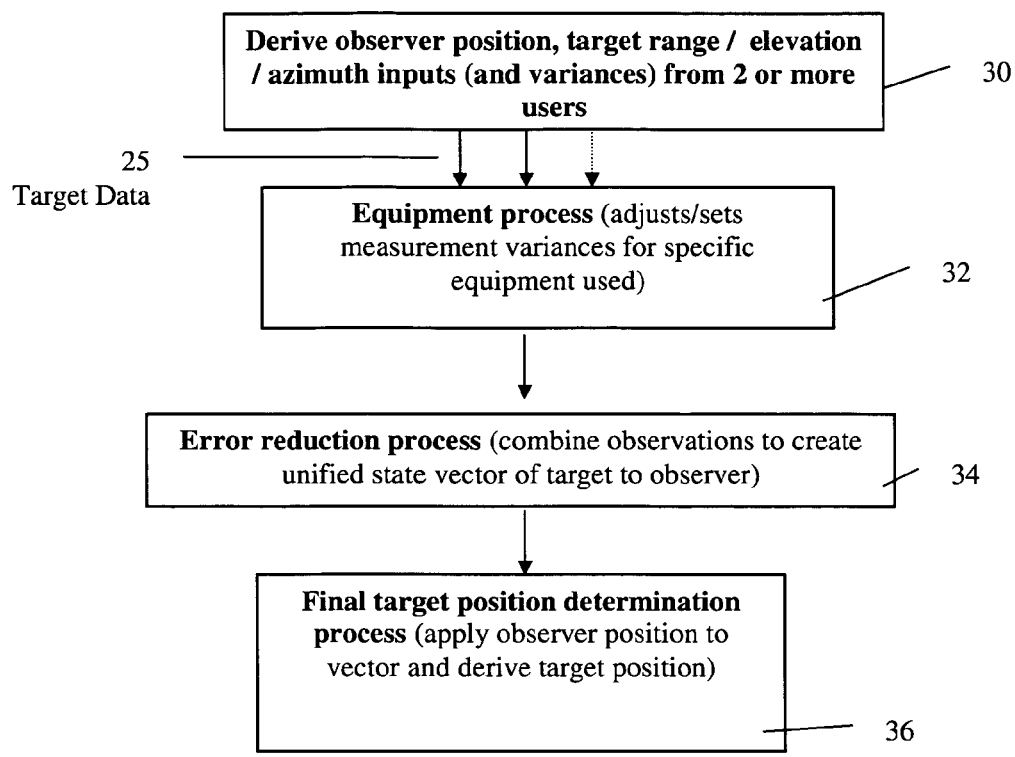
FIG. 3 illustrates a simplified flow chart of the exemplary device 2 in accordance with the present invention.
Figure 4:
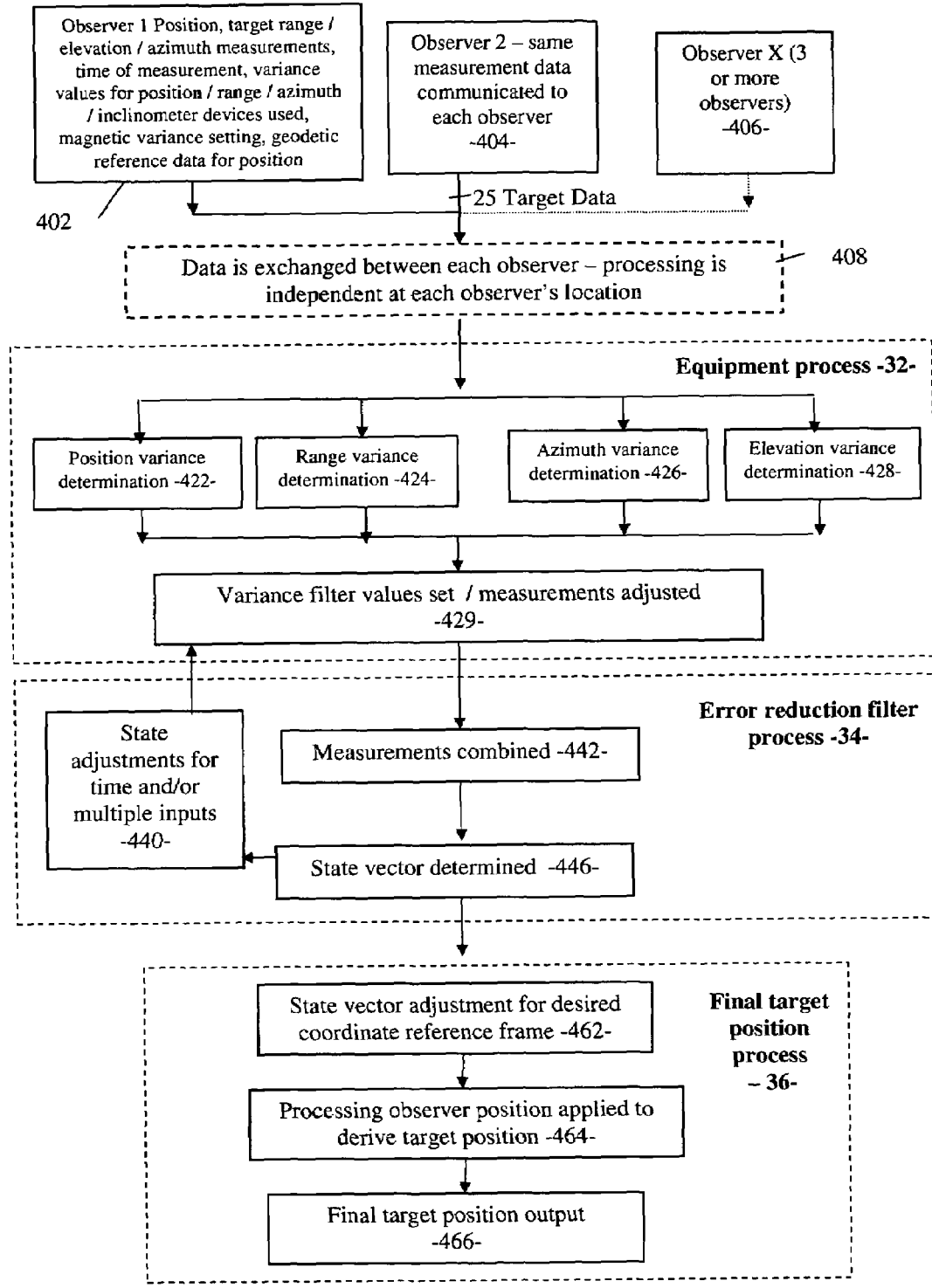
FIG. 4 illustrates a sub-system process flow in accordance with the present invention.

To illustrate the methodology in further detail, reference is now turned to the simplified process flow chart in FIG. 3, and FIG. 4, showing the sub-system thereof. At step 30, the observer position, target range/elevation (optional)/azimuth inputs, as well as variances, (the aforementioned "target data") are derived from preferably two or more observers. As previously described, each observer not only generates its own target data, but also exchanges the target data with all the other observers. At step 32, equipment processing adjusts or sets measurement variances for specific equipment used by the observer. At step 34, error reduction processing combines all received observations to create a unified state vector of target to the observer. Finally, at step 36, target solution processing applies the observer position to the state vector, and derive final target solution.

Referring to FIG. 4, step 402, observer 1's position, target range/elevation (optional)/azimuth measurements, time of measurement, variance values for position/range/azimuth/inclinometer devices used, magnetic variance setting, geodetic reference data for position (collectively "target data") are derived. In steps 404, 406, observer 2's and X's target data are also derived by each observer. At step 408, each observer's target data are exchanged with other observers through a data or comm link, and further processing can be conducted independently at each observer's location.

At step 32, the equipment process performs the following tasks to determine all the variances due to the equipment used in connection with each observer's target data:

Step 422, position variance is determined.
Step 424, range variance is determined.
Step 426, azimuth variance is determined.
Step 428, elevation variance is determined.
Step 429, variance filter values are set and adjustment measurements are generated based on the specific equipment used. It should be noted that the general filtered approach is taught in the aforementioned Johnson Paper, while the setting of each initial variance bound value is dictated by the performance of the adjusted filter which requires initial estimation to establish.

At step 34, the error reduction process performs the following tasks to combine observations to create a unified state vector of target to the observer:

Step 442, the adjustment measurements are combined. These measurements include the adjustments made to azimuth and range from each successive observation.

Step 446, the state vector is determined. This state vector is generated based on the range and azimuth results applied from step 442.

Step 440, state adjustments for time and/or multiple inputs based on the state vector are adaptively generated, wherein the results are fed back to step 429. Time-related adjustments are related to any extrapolation applied to the received target data on the system errors (primarily adjustments in satellite change to derive observer location) prior to use.

At step 36, the final target position process performs the following tasks to apply observer's position to the state vector and derive the final target solution:

Step 462, the state vector is adjusted for a desired coordinate reference frame. The state vector is referenced initially from the processing user's established location and utilizes the user-selected coordinate reference such that the solution result is easily understandable at the current location.

Step 464, the observer position is processed to derive target position.

Step 466, a final target solution is output.

The potential applications of the present invention extend well beyond the initial military forward observation situations to nearly any application that desires to calculate, with a known accuracy, the location of a remote object.

In the foregoing specification, the invention has been described with reference to specific embodiments thereof. It will, however, be evident that various modifications and changes may be made thereto without departing from the broader spirit and scope of the invention. The specification and drawings are accordingly to be regarded in an illustrative rather than a restrictive sense.

NOMENCLATURE

The following nomenclatures are provided for illustration purposes. They are intended to serve as a quick reference to the readers, without limiting the invention disclosed herein:

LRF Data (23)—A target's range, azimuth and elevation relative to the observer acquired by the LRF.

Final Target Solution (20)—A target solution based on the composite of all the Target Data from all the networked observers.

Target Data (25)—Each observer's position, target range/elevation/azimuth measurements, time of measurement, variance values for position/range/azimuth/inclinometer devices used, magnetic variance setting, and geodetic reference data for position. Each observer generates its own set of target data, which preferably is exchanged with other observers for the derivation of the Final Target Solution.

PLGR—Precision Lightweight GPS Receiver.
DAGR—Defense Advanced GPS Receiver.

I claim:

1. A system of generating targeted position estimation of a passive target through a plurality of observers, comprising:
   a single handheld device comprising:
      a global positioning system ("GPS") receiver, said GPS receiver being adapted to derive a first observer's first current location;
      a laser range finder, said laser range finder being adapted to derive first range and first azimuth from said first current location to said target, and optional first elevation of said first current location;
      an estimation engine coupled to and integrated with said laser range finder and said GPS, said estimation unit being adapted to generate first target data based on said first current location, first range, first azimuth and optional first elevation;
      a data receiver, said data receiver being adapted to receive at least second target data from at least a second observer, and to forward said second target data to said estimation engine, said second target data comprising a second current location, a second range, a second azimuth and a second elevation;

wherein, said estimation engine is adapted to receive said second target data from said data receiver, and to correlate and combine all received target data to derive a final target solution and said estimation engine further comprises:

an equipment variance processing unit, said equipment variance processing unit being adapted to determine position variance, range variance, azimuth variance and elevation variance of at least said first and second target data, and generate a plurality of adjustment measurements for specific equipment used by each observer;

an error reduction filter processing unit coupled to said equipment variance processing unit, said error reduction filter processing unit being adapted to combine said adjustment measurements to create a unified state vector of said target to said first observer;

a final target determination processing unit coupled to said error reduction filter processing unit, said final target determination processing unit being adapted to apply said first current location to said state vector and derive said final target solution; and where said final target determination processing unit comprises:

a state vector adjustment unit, said state vector adjustment unit being adapted to adjust said state vector for a predetermined desired coordinate reference frame;

an observer position unit coupled to said state vector adjustment unit, said observer position unit being adapted to apply said first current location to derive said final target solution.

2. A method of generating targeted position estimation of a passive target through a plurality of observers, the method comprising:

deriving a first observer's first current location;

measuring with a single handheld laser range finding device, first range and first azimuth to said passive target, and optional first elevation from said first current location;

deriving first target data based on said first current location, first range, first azimuth and optional first elevation;

receiving at least a second target data from at least a second observer, said second target data comprising a second current location, a second range, a second azimuth and a second elevation of said second observer; where said second range is measured with a handheld laser range finder;

collocating said first and at least said second target data, and estimating a final target solution; and wherein said step of estimating said final target solution further comprises:

processing equipment variance by determining at least one observer's collection of position variance, range variance, azimuth variance and elevation variance of said target data, and generating a plurality of adjustment measurements for specific equipment used by each observer;

processing error reduction filter by combining said adjustment measurements to create a unified state vector of said target to said first observer;

final target determination processing to apply said first current location of said first observer to the generated state vector and derive said final target solution; and where said final target determination processing comprises:

adjusting said state vector for a predetermined desired coordinate reference frame;

applying said first current location to said state vector to derive said final target solution; and transmitting said first target solution to at least said second observer.

* * * * *